Aug. 22, 1950     J. A. TOWNSEND     2,519,416
LIQUID RATE-OF-FLOW INDICATOR
Filed July 11, 1947
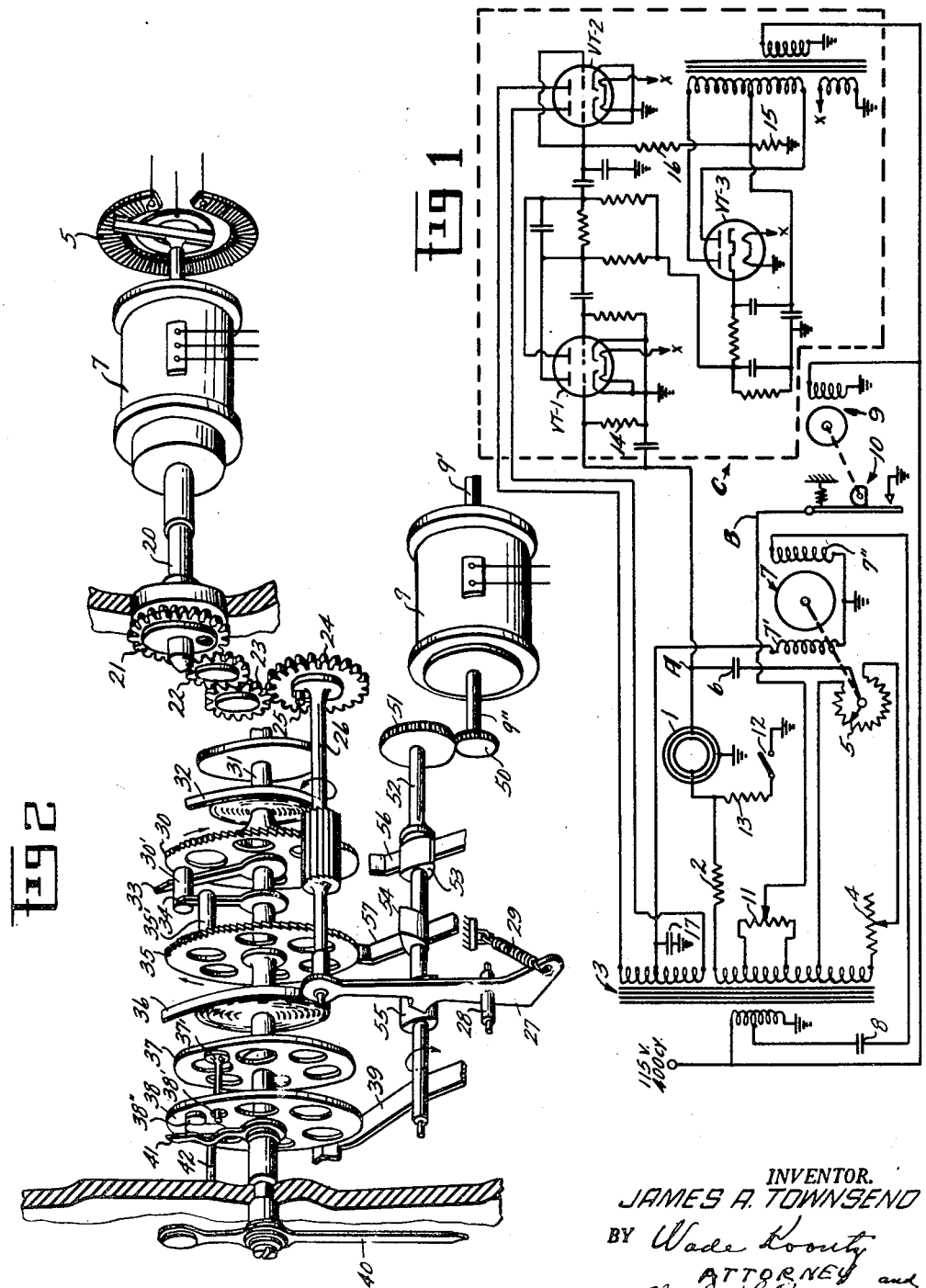
INVENTOR.
JAMES A. TOWNSEND
BY Wade Koonty
ATTORNEY and
Charles L. Burgoyne
AGENT Patented Aug. 22, 1950

2,519,416

UNITED STATES PATENT OFFICE 2,519,416

LIQUID RATE-OF-FLOW INDICATOR

James A. Townsend, Dayton, Ohio

Application July 11, 1947, Serial No. 760,422

5 Claims. (Cl. 73—113)

(Granted under the act of March 3, 1883, as amended April 30, 1928; 370 O. G. 757)

The invention described herein may be manufactured by or for the United States Government for governmental purposes without payment to me of any royalty thereon.

The present invention relates to a liquid rate-of-flow indicator, and more particularly to such an indicator for use on jet-driven or rocket-driven aircraft having relatively high rates of fuel consumption.

The primary object of the present invention is to provide a liquid rate-of-flow indicator for continuous indication of the flow rate of a liquid, such as the liquid fuel contained in the fuel tank of an aircraft. Liquid rate-of-flow indicators have been proposed heretofore but generally speaking these prior indicators were not entirely suitable for use on aircraft because of their weight and space requirements. This was particularly true where the indicator was capable of handling high rates of liquid flow.

It is a further object of the invention to provide a liquid rate-of-flow indicator which combines an electrical system responsive to changes in the liquid level within a container to produce rotation of an electrical motor proportional to the change in liquid level during a fixed period of time, and a mechanical system actuated by the rotation of the motor for indicating on a dial the rate of liquid flow into or out of the container.

Another object of the invention is to provide a liquid rate-of-flow indicator for use on aircraft which will give accurate results for very high rates of liquid flow and which may be so constructed and arranged as to take up a minimum of space in the aircraft.

A further object of the invention is to provide a rate-of-flow indicator including means to sample the liquid level in a tank at regular intervals and produce corresponding intermittent electrical signals capable of operating a mechanical indicating device through an electrical motor, for showing on a dial of the indicating device the rate of change of the liquid level in the tank. Since changes in liquid level correspond to changes in liquid volume, the dial when calibrated will show the rate of liquid flow in units of volume per unit of time.

The above and other objects of the invention will become apparent on reading the following specification and claims in conjunction with the accompanying drawing, in which:

Fig. 1 is a circuit wiring diagram of the rate-of-flow indicator.

Fig. 2 is a schematic diagram of the mechanical system or mechanism forming part of the rate-of-flow indicator.

Electrical circuit

Referring to Fig. 1 attention is directed to a variable capacitance 1 which is adapted for installation inside a fuel tank or other liquid container and is adapted to have its capacity varied in response to changes in the liquid level within the container. The capacitance preferably comprises three concentric sheet metal cylinders as indicated in the drawing, with the central axes thereof normally standing in a vertical position. As the liquid level rises in the tank the electrical capacity of the unit 1 increases, provided of course that the liquid has a dielectric constant higher than that of air. The dielectric constant of air is unity (1.0) while that of gasoline is approximately 2. Thus when the tank is full of gasoline the electrical capacity of the condenser unit 1 is about double what it would be if the tank were empty. The outermost cylinder of the unit 1 which is grounded serves as a housing for the unit and as an electrostatic shield therefor. The innermost cylinder is electrically connected by way of a 500 ohm resistor 2 to the lower secondary winding of the power transformer 3. The other end of the lower secondary winding is connected through calibrating resistor 4 (1000 ohms) to the balance potentiometer 5, the total resistance of which may be in the neighborhood of 1400 ohms. The winding of the potentiometer is also connected to the transformer 3 at a 37 volt tap on the secondary winding thereof. The wiper arm of the potentiometer is connected through the fixed condenser 6 (910 micromicrofarads) to the intermediate cylinder of the condenser unit 1 carried within the liquid tank.

The potentiometer 5 includes a wiper which is adapted to be driven in either direction of rotation by means of a two-phase indicator motor 7. The motor is preferably of a high-speed induction type so that a very high ratio reduction gearing is required between the motor and the potentiometer, a suggested ratio being 7000 to 1. This gearing is preferably built into the motor housing in the usual manner. One winding 7' of the motor which may be termed the rebalance field is connected to the upper secondary winding of transformer 3, and more specifically to a center tap of the winding. The other motor winding 7" which may be termed the reference field is connected through the condenser 8 (0.07 microfarad) to a 100 volt tap on the primary winding of transformer 3. Corresponding ends of the motor windings 7' and 7" are connected together and grounded as shown in Fig. 1. Besides driving the potentiometer the motor 7 is also connected to a mechanical indicator system as shown in Fig. 2 and thus provides through a low ratio reduction gear, means to operate the gear train illustrated in detail in the drawings. While the detailed description of this mechanical system is set out below it is noted that the timing control portion thereof is operated by means of a single-phase synchronous motor 9, the winding of which is connected to the same 115 volt, 400 cycle power line which supplies the primary of transformer 3. The motor 9 is connected to a cam-type make-and-break switch or interrupter 10. The switch is thus adapted to make a circuit at regular intervals between the center of the lower secondary winding of transformer 3 and ground, the center connection to the winding being through a calibration potentiometer 11.

The circuit as thus far described consists essentially of a capacity bridge comprising an upper branch which includes condenser unit 1 and a lower branch which includes the fixed condenser 6. Also included in the upper and lower branches of the bridge are upper and lower portions of the lower secondary winding of transformer 3. The take-off leads for the bridge circuit are indicated at A and B in Fig. 1, and these leads provide the input connections for the phase-discriminating amplifier C. The lead B reaches the amplifier by way of the make-and-break switch 10 and ground. In other words the bridge diagonal connected between points A and B includes the resistor 14 of amplifier circuit C, a ground connection to the switch 10 and the switch 10 itself. Since the capacity of condenser unit 1 varies with the level of liquid in the fuel tank, the current in the upper branch of the bridge circuit will increase or decrease with an increase or decrease of condenser capacity. However by the use of the motor-driven potentiometer 5 the current flowing in the lower branch of the bridge circuit may be varied to provide a self-balancing bridge circuit. This feature will be described more in detail below, but it is noted that the unit 5 may be termed a rebalancing potentiometer because of its bridge balancing function.

The circuit of Fig. 1 further includes a testing switch 12 in series with a resistor 13 of about 400 ohms. Upon closing the switch 12 the circuit completed to ground will completely unbalance the bridge circuit and the response which will be produced in the indicating instrument will show that the electrical and mechanical systems involved in the flow indicator are functioning in a normal manner. For instance when the rate-of-flow indicator is installed on an aircraft the device may be checked at any time by closing the switch 12, and a response on the indicator dial will show that the system is functioning. The calibration resistors 4 and 11 are merely for the purpose of adjusting the bridge circuit when the indicator is installed. After the calibration setting is obtained these resistors are never changed unless various electrical components are replaced by new components having slightly different characteristics.

When the bridge circuit is in balance the current in the upper branch will be equal to the current in the lower branch. Because these branches connect to opposite ends of the center-tapped lower secondary winding of transformer 3, the currents therein will always be 180° out of phase with respect to each other. Thus, in a balanced condition of the bridge circuit, the equal and oppositely-phased currents will cancel each other in the bridge diagonal which includes resistor 14 (1 megohm) and no potential will appear across the bridge take-off leads A and B. Assuming now that the bridge is unbalanced by increasing the capacity of condenser unit 1, a current will flow in the branch of the ridge circuit including this condenser which will be greater than that in the lower branch of the bridge including condenser 6 and rebalancing potentiometer 5. Therefore this larger current will cancel out the smaller current and the resultant will provide an input for the amplifier C, assuming of course that the switch 10 is closed.

The input of the phase-discriminating amplifier C is connected across the bridge take-off leads A and B and with the bridge out of balance a small potential will be impressed on the resistor 14 of the amplifier circuit, but only at such times that the make-and-break switch 10 is closed. The tube VT-1 of the amplifier may be of type No. 7F7, the tube VT-2 may be of type No. 7N7, and the rectifier tube VT-3 may be of type No. 7Y4. The amplified signal from the tube VT-1 is passed to the connected grids of the double triode VT-2. These grids are normally biased to cut-off by reason of the voltage developed across the resistor 15 (10,000 ohms) by rectifier tube VT-3, and applied to the grids through grid resistor 16 (1 megohm). Therefore if the bridge circuit is in balance and the amplifier input is zero no current will flow from anode to cathode in the tube VT-2. However with the bridge circuit out of balance the current in either the upper or lower branch will predominate and a potential will be impressed on the amplifier tube VT-1. The resultant output of tube VT-1 is impressed on the grid circuit of the phase-discriminating tube VT-2. The plates of the latter tube being connected respectively to opposite ends of the center-tapped upper secondary winding of transformer 3, the potential on one of the plates will be 180° out of phase with respect to the potential on the other plate. However one or the other of these potentials will be in phase with the amplified bridge output, depending on which branch of the bridge circuit carries the predominating current. That section of the tube VT-2 which has its anode potential in phase with the grid potential acts as a half-wave rectifier for the 400 cycle potential on its anode. The result is a pulsing direct current which flows through motor winding 7' back to the center tap of the upper secondary winding of the transformer 3. The motor winding 7' is tuned by condener 17 (0.07 microfarad) to the fundamental frequency of the pulsing direct current, which is 400 cycles. In this way a 400 cycle alternating current is developed in the winding 7'. This current is either in phase or 180° out of phase with respect to the current in the primary winding of transformer 3, depending upon which section of tube VT-2 is operative. The current in motor winding 7" is 90° out of phase with respect to the current in the primary winding of transformer 3 due to the action of condenser 8. It is therefore seen that the current in winding 7' either leads or lags the current in winding 7" by 90° depending upon which section of tube VT-2 is operative, and this in turn depends on the phase of the signal applied to the input of amplifier VT-1. Thus the conditions for rotation in a two-phase induction motor are satisfied, because of the 90° phase difference in the two field windings. With the current in the rebalance field 7' leading the current in the reference field 7" the rotation will be in one direction, and when the current in field 7' lags the current in field 7" the rotation will be in the opposite direction.

In the complete circuit as shown in Fig. 1 the phase relations are so adjusted that if the current in the upper branch of the bridge circuit exceeds the current in the lower branch, the motor 7 rotates the rebalancing potentiometer 5 in a direction to introduce more voltage into the branch of the bridge including the potentiometer, thus increasing the current therein until the bridge is balanced and no further current is applied to amplifier tube VT-1. If the current in the upper branch of the bridge circuit, including condenser 1, is less than the current in the lower branch, including condenser 6, then the phase of the potential applied to tube VT-1 will be opposite to that applied to the preceding situation. Therefore the other section of tube VT-2 will be operative, and as a result the phase of the current in the rebalance field 7' will be reversed. This will cause the motor 7 and the potentiometer 5 to rotate in the opposite direction, thus reducing the current in the lower branch of the bridge circuit until a balanced condition is again attained and the voltage applied to the tube VT-1 is reduced to zero. Then both sections of tube VT-2 become inoperative, and the motor 7 stops because the rebalance field 7' is no longer receiving its excitation from the phase-discriminating amplifier C.

Mechanical system

Referring now to Fig. 2 for a description of the mechanical indicator system, whereby changes in capacity of the tank unit 1 are translated into indications of the rate of change, the motor 7, potentiometer 5 and the motor 9 are shown including the various electrical leads therefor. As previously noted the drive connection between motor 7 and rebalancing potentiometer 5 provides a high ratio reduction gear, so that the motor may operate at high speed through many revolutions without turning the potentiometer through more than a portion of one revolution. Likewise a reduction gear is provided between the motor 7 and drive shaft 20 but the gear ratio is preferably rather low. The shaft 20 carries a spur gear 21 in mesh with a pinion 22 which in turn meshes with a pinion 23. Pinion 23 drives the commander gear 24, which carries a commander pin 25. The floating pinion 26 is positively driven by the commander pin 25 but is free to rock slightly about the end abutting the gear 24. The opposite end of the floating pinion 26 swings back and forth under the influence of the lever 27 pivoted to the instrument case by means of the pivot 28. The tail end of the lever is connected to a coil spring 29, which acts to urge the lever 27 and the floating pinion journaled thereon into a pinion driving position with respect to the integrator wheel 30. The pinion 26 and wheel 30 have ratchet teeth on their periphery, so that the pinion when driven in the direction of the curved arrow is adapted to drive the integrator wheel 30 in a manner similar to the repeated impacts of a tapping stick against a rolling hoop.

The floating pinion 26 must have a constant meshing period in order to make possible the integrating action of the mechanism shown in Fig. 2. This timing control includes a single-phase synchronous motor 9 which drives the make-and-break switch 10 through the shaft portion 9', and also drives the pair of meshing gears 50 and 51 through the shaft portion 9". The gear 51 is carried on a camshaft 52, which carries timing cams 53, 54 and 55. The cams 53 and 54 act to lift the spring arms 56 and 57, while the cam 55 acts to control the lever 27 and floating pinion 26. The direction of camshaft rotation is indicated by the curved arrow thereon. The cam 55 has a peripheral contour which is adapted to hold the floating pinion out of driving relation through about one-third of a revolution of the camshaft, the pinion being in driving relation through the remaining two-thirds of each camshaft revolution. The constant speed of motor 9 is thus adapted to insure that the floating pinion 26 will be in driving relation with respect to the integrator wheel 30 for definite and regular intervals of time.

The integrator wheel 30 is carried on the main staff 31 but is free to turn thereon by the action of pinion 26. The recoil spring 32 adjacent to wheel 30 acts to return the wheel to its starting position when released by the pinion and by the spring arm 56. The latter element is controlled by the cam 53 in such a manner as to contact the wheel 30 for a short period of time immediately upon disengagement of the pinion 26 and wheel 30, thus preventing any possible overtravel of the integrator wheel under its own momentum. The starting of zero position of the whel 30 is determined by a pillar in the instrument case placed at the side of wheel 30 almost directly opposite to the pinion 26. This pillar, which is not shown, is placed close to the periphery of the wheel 30 and is adapted to be contacted by a finger 33 free to turn on the main shaft 31. The finger is in turn contacted by a pin 30' carried on wheel 30. If the instrument pointer were attached directly onto the wheel 30 the maximum indication would be momentarily correct but only for the instant between the time the pinion 26 disengages the wheel 30 and the spring arm 56 disengages the wheel, or in other words while the wheel 30 is retained in its position of maximum displacement by the spring arm 56. Such an indication would obviously not be very practical, and for this reason further elements are required in the instrument.

A second ratchet wheel 35, termed a corrector wheel, is mounted on the main staff 31 for rotative movement with respect to the wheel 30. The finger 34 mounted for free rotation on the main staff is adapted for driving contact by the pin 30' on the wheel 30, and the finger 34 in turn is adapted to drive the corrector wheel 35 through the pin 35' mounted thereon. The corrector wheel is adapted to be returned to the zero position by means of the recoil spring 36, and the same pillar described above determines the zero position by contact with the finger 33. The arrows adjacent the peripheries of wheels 30 and 35 indicate only the direction of rotation thereof under the influence of pinion 26. Their return to zero position will be in a direction opposite to these arrows. The spring arm 57, which is in contact with the corrector wheel 35 except when the high point of cam 54 forces it away from the wheel, is adapted to release the corrector wheel for an instant during each revolution of the camshaft so that this wheel may turn towards the zero position if a reduced flow rate is in effect at that time. Of course the corrector wheel will only return as far as the position of the integrator wheel 30 and the pin 30' will permit. Also it will be noted that the cams 53 and 54 are so arranged on the camshaft that release of the corrector wheel by spring arm 57 occurs when the integrator wheel is maintained at its maximum setting by the spring arm 56 acted on by cam 53. Thus the corrector wheel will be momentarily released for return under the influence of recoil spring 36 to a position corresponding to the latest setting of the integrator wheel 30. If this latest setting is farther from the zero position than the previous maximum, then of course the corrector wheel will not have any return movement when released by the spring arm 57.

Rotatable with the corrector wheel 35 is a secondary corrector wheel 37, these two wheels together forming a unitary assembly rotatably mounted on the main staff 31. The wheel 37 carries a pin 37' which projects into an aperture 38' in the stabilizer wheel 38, so as to provide lost motion between wheel 37 and wheel 38. The purpose of this construction is to steady the instrument needle by preventing transmission of slight impulses from the corrector wheels to the stabilizer wheel 38. Further assisting in the action of the stabilizer wheel is a spring arm 39 having a curled up free end adapted to ride on the periphery of the stabilizer wheel 38. It might be noted the spring arms 56, 57 and 39 are secured to a pillar of the instrument case, while the free ends of the recoil springs 32 and 36 are secured to another pillar which is the same pillar contacted by the finger 33 to determine the zero setting of the instrument. Directly connected to the stabilizer wheel 38 is the instrument pointer or needle 40, which has a pointed end portion adapted to move over a circular set of graduations or dial to indicate rate of liquid flow in any appropriate units, such as gallons per minute. The zero setting of the pointer is determined by a finger 41 rotatably mounted with respect to the main staff and stabilizer wheel 38. An indented mid-portion of the finger 41 is adapted to contact a pin 42 fixed to the instrument case, while the free end of the finger is adapted to be contacted by a projection 38" on the stabilizer wheel 38.

As a safety feature in the mechanism disclosed the finger 33 adjacent to the integrator wheel 30 may have its free end cut off on the bias in such a manner as to be adapted for contacting the floating pinion 26 along the cut off end, and thereby rock the pinion out of driving relation with respect to the integrator wheel. Thus if the wheel 30 should be driven around to an extent which might damage the recoil springs, the pin 30' will move around to the side of the finger 33 opposite to that shown in contact with the same pin in Fig. 2. Then the finger 33 may eventually be forced around until its free end contacts the teeth of pinion 26 and thereby acts as a cam to rock the floating pinion out of mesh with respect to the wheel 30. As the camshaft 52 continues to rotate, the wheels 30 and 35 will be released by the spring arms 56 and 57, thus allowing the wheels to return to their starting positions and again allowing the floating pinion to resume its normal operation. This safety feature as described will not function unless the rate of flow should rise to such a high level that there would be danger of breaking the recoil springs. As a variation of the construction above described, the finger 33 may merely be made of such a length that it will strike against the pinion 26 and thus prevent further movement of the wheel 30 beyond that point. This is not the preferred construction since it will not cause disengagement of the pinion from the wheel 30, by the camming action previously described.

*Summary of operation*

In the rate-of-flow indicator above described the motor 7 will always operate in the same direction during emptying of a fuel tank for instance, since there will be a steady decrease in capacity of the condenser unit 1 and the bridge balancing movement of the potentiometer 5 must proceed in one direction accordingly. However during the tank filling operation the opposite conditions will obtain and the motor 7 will rotate in a reverse sense. Since rate-of-flow readings may be important under both of these conditions, the pinions 22 and 23 preferably constitute a torque-responsive reversing means so that either direction of motor rotation will produce the same direction of rotation in the gear 24 and pinion 25. While the details of this feature do not constitute part of the present invention, this reversing means may be described as including two pinions 22 and 23 always in mesh with each other and rotatably mounted on a separate plate which is pivoted at a central point thereof to the bearing plate serving to rotatably mount the gears 21 and 24. Since the pinion-carrying plate is free to turn about its pivot lying midway between the two pinions, the pinion and plate assembly may assume two different driving positions with respect to the driving and driven gears 21 and 24. In the position of Fig. 2 the pinions mesh with the two gears to give a reversal of relative rotation between gears 21 and 24. However upon reversal of rotation of the gear 21 the pinion and plate assembly swings as a unit to bring only the pinion 22 into mesh between the two gears 21 and 24, thus causing the latter to rotate in the same relative direction. The operation of the torque-responsive reversing gear is entirely automatic, and if the parts are kept lubricated this device will give trouble-free service for the life of the indicating instrument. By using the reversing means as described the rate of liquid flow into the fuel tank will read on the indicator dial exactly the same as when the liquid is flowing out of the tank.

According to the principles of operation of the present rate of flow indicator the balanceable bridge circuit, or network as it might be called, is constantly becoming more unbalanced as the capacity of condenser 1 changes due to the constantly changing level of liquid in the tank, either increasing or decreasing depending on whether the tank is being filled or emptied. Switch 10, driven by constant speed motor 9, operates to periodically connect the bridge circuit to the rebalance field 7' through the amplifier circuit C for equal intervals of time. During each interval of time in which the circuit C is connected to the bridge through switch 10, a signal resulting from the unbalanced condition of the bridge is applied to the phase-sensitive circuit C which causes the motor 7 to operate to rebalance the bridge circuit in a manner already explained. The number of revolutions made by motor 7 in rebalancing the bridge circuit is proportional to the degree of unbalance of the bridge. Therefore if the rate of change of liquid level is constant, the degree to which the bridge is unbalanced between each interval of time in which the switch 10 is closed will be the same and therefore motor 7 will be required to make the same number of revolutions to rebalance the bridge during each of these time intervals. This would be the condition for a constant rate of flow into or out of the tank, which rate of flow would be indicated by the instrument pointer 40 in a manner already described. Any change in the rate of flow will cause a change in the degree of unbalance of the bridge between the intervals of time that the switch 10 is closed, and a corresponding change in the number of revolutions of the motor 7 required to rebalance the bridge. In other words the electrical system disclosed is capable of regularly sampling the change of total liquid volume taking place in a given interval of time by producing corresponding unbalance of the bridge circuit. By utilizing the amount of rotation of the bridge rebalancing motor 7 as an indication of change in liquid volume or liquid level during definite time intervals, the mechanical system (Fig. 2) including this motor is adapted to translate the amount of motor rotation for each interval into a liquid rate-of-flow indication.

It should be noted also that for proper operation the speed of the shaft driving the switch 10 is exactly the same as the speed of camshaft 52, so that the cam 55 on shaft 52 and the cam of the switch 10 (Fig. 1) will complete their cycles of operation at the same time. Furthermore the contours of these cams are so shaped that the floating pinion 26 will mesh with the integrator gear 30 at least as long as the switch 10 is closed. More specifically the cams are proportioned so that pinion 26 meshes with the gear 30 before the switch 10 closes and stays in mesh until after the switch opens. Thus the full effect of the motor rebalancing rotation will be obtained for each time interval as determined by operation of the switch 10.

In a rate-of-flow indicator as described herein it is understood that certain components may be modified without changing the principles of operation as set out above. For instance the condenser unit 1 may be a variable condenser having relatively movable plates or surface-forming elements operated by means of a float within the liquid tank. This modification would be particularly suitable in cases where the liquid under consideration has variable or doubtful dielectric properties, such as water or aqueous solutions. If desired the condensers 1 and 6 may be replaced by inductance units, with the variable unit corresponding to condenser 1 including a float-operated iron core for varying the inductive effect in response to changes in the liquid level. Furthermore in case the liquid to be used in the tank has definite magnetic properties, such as liquid oxygen or liquid air, the liquid itself may form a magnetic core for the variable inductance to provide variations in the inductive effect with changes in the liquid level in the tank. If desired the bridge or network circuit may depend on resistance units for its operation, but in any case the choice of a particular type of electrical impedance will not alter the general principles of operation as above set out.

The embodiments of the invention herein shown and described are to be regarded as illustrative only and it is to be understood that the invention is susceptible to variations, modifications and changes within the scope of the appended claims.

I claim:

1. A liquid rate-of-flow indicator comprising, a balanceable network circuit, impedance means included in said circuit adapted to unbalance said circuit in direct proportion to changes in the liquid level in a liquid container, circuit rebalancing means included in said network circuit, a motor forming part of said rebalancing means and including a reference field and a rebalance field, means for periodically connecting the output of said network circuit to said rebalance field for equal intervals of time during which said rebalancing means operates to rebalance said network circuit, and means responsive to the extent of operation of said motor in each interval to give an indication proportional to the rate of change of liquid level in the container.

2. A liquid rate-of-flow indicator comprising, an electrical impedance means operative to have its impedance varied in direct proportion to variations of the liquid level in a liquid container, an electrical bridge circuit including impedance means in one branch thereof, bridge circuit rebalancing means in another branch of said circuit, means including a first electrical motor responsive to an unbalance of said bridge circuit to actuate said rebalancing means, switch means operable at a steady time rate by a second electrical motor to complete an energizing circuit from said bridge circuit to said first motor at regular intervals of time, an indicator device mechanically connected to said first motor and including a gear train, a disconnect means in said gear train actuated by means including said second motor in such a manner that said gear train is operative while said switch means is closed, and an indicator element operated through said gear train and responsive to the extent of operation of said first electrical motor during each period said switch means is closed and adapted to show the rate of change of liquid level in the container.

3. A liquid rate-of-flow indicator comprising, an electrical impedance means operative to have its impedance varied in direct proportion to variations of the liquid level in a liquid container, an electrical bridge circuit including said impedance means in one branch thereof, a bridge circuit rebalancing potentiometer in another branch of said circuit, means including a first electrical motor responsive to an unbalance of said bridge circuit to actuate said potentiometer in a bridge balancing direction, said first motor including a reference field and a rebalance field, switch means operable at a steady time rate by a second electrical motor to complete an energizing circuit from said bridge circuit to said rebalance field at regular intervals of time, an indicator device mechanically connected to said first motor and including a gear train, a disconnect means in said gear train actuated by means including said second motor in such a manner that said gear train is operative while said switch means is closed, and an indicator element operated through said gear train and responsive to the extent of operation of said first electrical motor during each period said switch means is closed to show the rate of change of liquid level in the container.

4. A liquid rate-of-flow indicator comprising, an electrical impedance means operative to have its impedance varied in direct proportion to variations of the liquid level in a liquid container, an electrical bridge circuit including said impedance means in one branch thereof, a variable bridge circuit rebalancing impedance in another branch of said circuit, a reversible electric motor for operating said variable bridge circuit rebalancing impedance to rebalance said circuit upon unbalance thereof by said electrical impedance means, said motor including a reference field winding and a rebalance field winding, a phase-discriminating amplifier having its input connected to the output terminals of said bridge circuit and having its output connected to said rebalance field winding, means for periodically energizing said bridge circuit from a source of electrical potential for equal intervals of time during which said electric motor may operate in one direction or the other to rebalance said bridge circuit by means of said variable bridge circuit rebalancing impedance, and indicator means responsive to the extent of motor operation in each equal interval of time to give an indication proportional to the rate of change of liquid level in the container.

5. A liquid rate-of-flow indicator comprising, an electrical impedance means operative to have its impedance varied in direct proportion to variations of the liquid level in a liquid container, an electrical bridge circuit including said impedance means in one branch thereof, a variable bridge circuit rebalancing impedance in another branch of said circuit, a reversible electric motor for operating said variable bridge circuit rebalancing impedance to rebalance said circuit upon unbalance thereof by said electrical impedance means, said motor including a reference field winding and a rebalance field winding, a phase-discriminating amplifier having its input connected to the output terminals of said bridge circuit and having its output connected to said rebalance field winding, switch means operable at a steady time rate by a second motor for periodically energizing said bridge circuit from a source of electrical potential for equal intervals of time during which said reversible electric motor may operate in one direction or the other to rebalance said bridge circuit by means of said variable bridge circuit rebalancing impedance, an indicator device mechanically connected to said reversible electric motor and including a gear train, a disconnect means in said gear train actuated by means including said second motor in such a manner that said gear train is operative while said switch means is closed, and an indicator element operated through said gear train and responsive to the extent of operation of said reversible electrical motor during each period said switch means is closed to show the rate of change of liquid level in the container.

JAMES A. TOWNSEND.

REFERENCES CITED

The following references are of record in the file of this patent:

UNITED STATES PATENTS

| Number | Name | Date |
|---|---|---|
| 1,696,600 | Hall | Dec. 25, 1928 |
| 2,103,077 | Herron | Dec. 21, 1937 |
| 2,188,628 | Freystedt | Jan. 30, 1940 |
| 2,354,945 | Cohen et al. | Aug. 1, 1944 |